United States Patent
Adelizzi

[11] 3,720,419
[45] March 13, 1973

[54] FABRICATED LABYRINTH SEAL STRUCTURE

[75] Inventor: Richard S. Adelizzi, Marlton, N.J.

[73] Assignee: Westinghouse Electric Corp., Pittsburgh, Pa.

[22] Filed: Jan. 21, 1971

[21] Appl. No.: 108,428

[52] U.S. Cl. .................................. 277/53, 415/174
[51] Int. Cl. ..................... F02f 11/00, F01d 11/08
[58] Field of Search...416/174; 277/53, 55, 56, 96 R; 415/174

[56] References Cited

UNITED STATES PATENTS

| | | | |
|---|---|---|---|
| 3,503,616 | 3/1970 | Hickey | 277/53 |
| 2,886,351 | 5/1950 | Heard | 277/53 |
| 2,963,307 | 12/1960 | Bobo | 416/174 |
| 3,501,089 | 3/1970 | Alford | 277/53 |
| 3,038,730 | 6/1962 | Bentley | 277/53 X |
| 3,317,254 | 5/1967 | Sattertwaite | 416/174 |

FOREIGN PATENTS OR APPLICATIONS

| | | | |
|---|---|---|---|
| 840,573 | 7/1960 | Great Britain | 277/55 |

Primary Examiner—Samuel B. Rothberg
Attorney—A. T. Stratton, F. P. Lyle and F. Cristiano, Jr.

[57] ABSTRACT

Inherent flexibility is incorporated in a labyrinth seal structure for a rotatable member by providing a relatively thin arcuately segmented corrugated metal sheet having honeycomb metal seals secured to the ridges of the corrugated metal sheet, thereby precluding the need for the spring-backed grooved seal rings previously utilized in labyrinth seals.

4 Claims, 3 Drawing Figures

PATENTED MAR 13 1973 3,720,419

FABRICATED LABYRINTH SEAL STRUCTURE

BACKGROUND OF THE INVENTION

This invention relates, generally, to seals for controlling leakage of a fluid around a rotatable member and, more particularly, to seals of the labyrinth type.

Heretofore, labyrinth seals have usually included arcuately segmented grooved metal rings mounted around a rotatable member, such as a shaft, having grooves therein corresponding to the grooves in the seal rings. Lead springs have been provided to maintain the ring segments in position and to permit misalignment of the shaft without excessive rubbing of the seal members.

SUMMARY OF THE INVENTION

In accordance with one embodiment of the invention, a labyrinth seal for rotatable member, such as a shaft, is constructed of relatively thin arcuately segmented corrugated sheet metal having arcuate segments of a honeycomb metal seal welded to the ridges of the corrugations. Each side edge of each corrugated sheet segment has a portion which extends axially and then radially with another axially extending portion welded to a back-up member to provide inherent flexibility in the seal structure without utilizing back-up springs. The honeycomb metal seals are installed with a small clearance between the seals and the rotatable member, thereby obtaining minimum leakage around the rotatable member.

BRIEF DESCRIPTION OF THE DRAWING

For a better understanding of the nature of the invention, reference may be had to the following detailed description, taken in conjunction with the accompanying drawing, in which.

DESCRIPTION OF THE PREFERRED EMBODIMENTS

Figure 1:
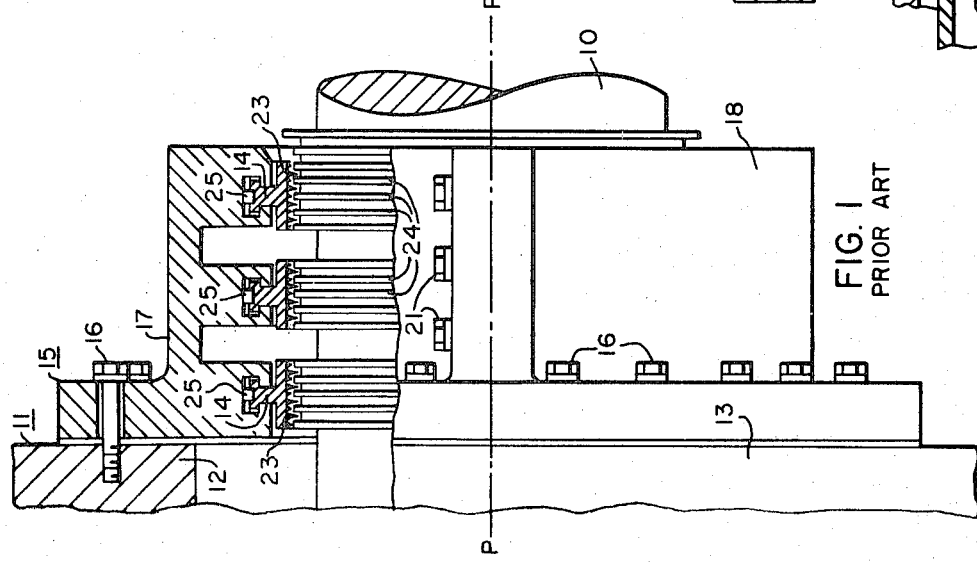
FIG. 1 is a view, partly in side elevation and partly in section, of a portion of a steam turbine including a gland case having a labyrinth seal structure therein constructed in accordance with the prior art.

In FIG. 1 of the drawing, there is shown a labyrinth seal structure constructed in accordance with the prior art. As described in U.S. Pat. No. 3,503,616 issued Mar. 31, 1970 to Herbert A. Hickey and assigned to the same assignee as the present application, the portion of a turbine structure shown in FIG. 1 comprises a shaft 10 rotatably mounted in a main housing 11 which is divided along a horizontal plane P-P into an upper portion 12 and a lower portion 13. The shaft 10 is supported in suitable bearings (not shown).

In order to reduce steam leakage around the shaft 10, arcuately segmented seal rings 14 of the labyrinth type are mounted around the shaft 10 in the main housing 11 and also in a gland case 15 which is removably attached to the end of the main housing 11 by bolts 16.

The gland case 15 is also divided along a horizontal plane into an upper portion 17 and a lower portion 18. As described in the aforesaid patent, each segmented gland ring 14 is divided along a horizontal plane into an upper portion and a lower portion. The two halves of the gland case 15 are bolted together by bolts 21. Likewise, the two halves of the main housing 11 may be bolted together by bolts (not shown).

As shown in FIG. 1, each gland ring 14 has a plurality of ridges 23 thereon which extend into grooves 24 on the shaft 10, thereby providing a shaft seal of the labyrinth type. A leaf spring 25 is provided between each segment of the seal ring 14 and the gland case 15. The springs 25 hold the segmented seal ring 14 into position when there is no pressure in the gland case 15 and allow the segments of the seal ring 14 to move radially outwardly when rubbing with the shaft occurs due to misalignment of the shaft.

A labyrinth seal constructed in accordance with the prior art requires expensive machining of the seal ring segments and the shaft. As previously explained, back-up springs are required between the seal ring segments and the enclosing casing. Furthermore, the seal ring segments have usually been composed of bronze, thereby requiring provision for a larger thermal expansion between the bronze seals and the casing.

Figure 2:
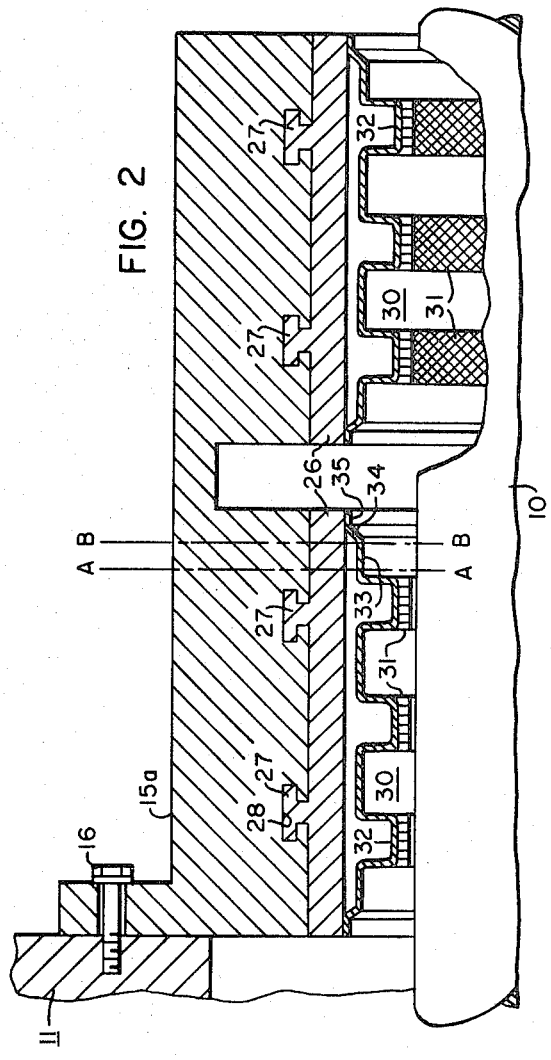
FIG. 2 is a view, in secton, of a portion of a gland case similar to that shown in FIG. 1 and having a labyrinth seal structure therein constructed in accordance with the present invention.

In order to provide a more efficient and less expensive seal, the labyrinth seal structure shown in FIG. 2 has been devised. In the structure shown in FIG. 2, the shaft 10 is rotatably mounted in a housing 11 having a gland case 15a attached to one end of the housing by means of bolts 16. The shaft 10 extends through the main housing 11 and the gland case 15a. The labyrinth seal structure comprises generally cylindrical arcuately segmented back-up members 26 having T-shaped portions 27 thereon slidably disposed in T-shaped grooves 28 in the casing 15a.

A relatively thin generally cylindrical arcuately segmented corrugated metal sheet 30 is secured to each segment of each back-up member 26, as by welding. Arcuately segmented seal rings 31 are secured to ridges 32 of the corrugated metal sheets 30. As shown more clearly in the right hand portion of FIG. 2, the seal rings 31 may be of a cellular structure composed of a honeycomb metal, or other suitable material, and they are disposed in close proximity to the shaft 10, thereby minimizing leakage around the shaft. The corrugated sheets 30 are preferably composed of steel, thereby precluding the need for the large thermal expansion allowance previously required between bronze seals and the backing piece.

In order to provide flexiblity in the seal structure, each side edge of each segment of the corrugated sheet 30 has an axially extending portion 33, a radially extending portion 34 and another axially extending portion 35 which is secured to the back-up member 26, as by welding, thereby spacing the sheet 30 from the back-up member. Thus, if misalignment of the shaft occurs, the seal structure will flex at section AA to BB, and at similar sections on opposite sides, to take care of the misalignment without excessive rubbing between the seal rings 31 and the shaft 10. Therefore, back-up springs are not required in the present seal structure.

Figure 3:
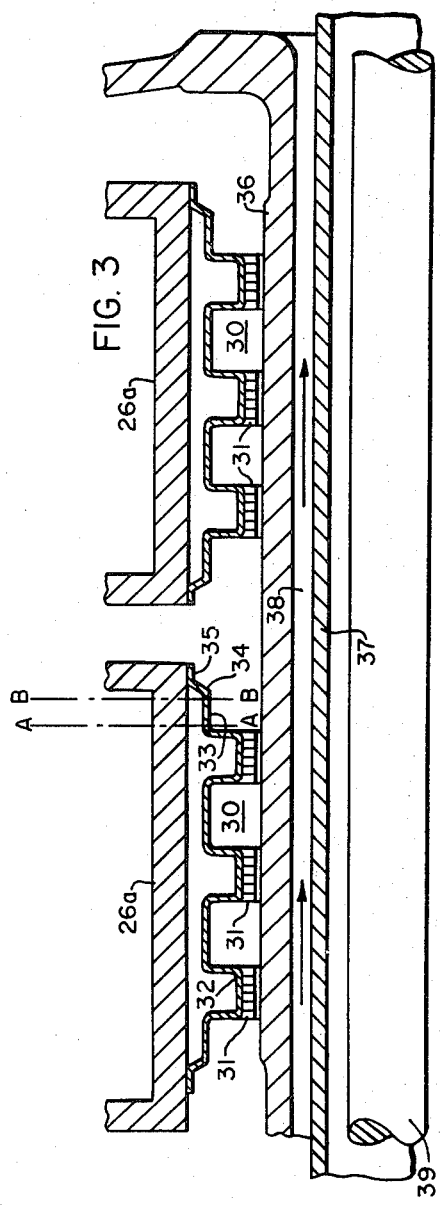
FIG. 3 is a view, in section, of a portion of a gas turbine having a labyrinth seal structure therein also constructed in accordance with the present invention.

In the embodiment of the invention shown in FIG. 3, the labyrinth seal structure is utilized in conjunction with a structure for cooling the root portions of gas turbine rotor blades, such as described in a copending application Ser. No. 791,892, filed Jan. 17, 1969, now U.S. Pat. No. 3,572,966, by James Howard Borden and Augustine Joseph Scalzo and assigned to the same assignee as the present application. The structure shown comprises a rotatable tubular member 36 encompassing and spaced from a torque tube 37 to provide an air passageway 38 between the member 36 and the tube 37. The torque tube 37 surrounds stay bolts 39 which extend through the torque tube to the rotor of a compressor (not shown). Air from the compressor is delivered to the turbine rotor discs, (not shown) through the passageway 38 as indicated by the arrows.

The labyrinth seal structure is similar to the one previously described. Back-up members 26a are mounted in the turbine stator structure in any suitable manner. The segmented corrugated metal sheets 30 are secured to the segmented annular back-up members 26a in the manner hereinbefore described to provide inherent flexibility in the seal structure. As previously described, the seal structure is segmented with minimum width gaps between segments to permit thermal expansion of the structure.

From the foregoing description, it is apparent that the invention provides a labyrinth seal structure having inherent flexiblity. A more efficient sealing device than prior devices is provided since the present structure can maintain closer radial clearance, as the rotatable member of the seal arrangement can be relied on to set the minimum clearance required. The present structure is relatively low in cost. There is a relatively high reduction in the cost of the seals alone, as compared with prior labyrinth seal structures. An even greater cost savings is effected since a more efficient seal is provided, thereby requiring less seals and a shorter machine.

I claim as my invention:

1. A labyrinth seal structure for a rotatable member, said seal structure comprising a generally cylindrical back-up member spaced from and encircling the rotatable member, a relatively thin, generally cylindrical, corrugated sheet metal member encircling the rotatable member within the back-up member and being attached to the back-up member at the ends of the sheet metal member, the corrugations of said sheet metal member extending circumferentially to form a plurality of circular, substantially parallel ridges spaced apart axially of the sheet metal member, and seal rings secured to said ridges in close proximity to the rotatable member.

2. A labyrinth seal as defined in claim 1 in which said seal rings are made of honeycomb metal.

3. A labyrinth seal as defined in claim 1 in which said sheet metal member has sufficient flexibility to compensate for misalignment.

4. A labyrinth seal as defined in claim 3 in which said seal rings are made of honeycomb metal.

* * * * *